United States Patent [19]

Keating

[11] 4,026,804
[45] May 31, 1977

[54] AUTO CRUMB REMOVER

[76] Inventor: Richard T. Keating, 715 S. 25th Ave., Bellwood, Ill. 60104

[22] Filed: Apr. 26, 1976

[21] Appl. No.: 680,081

[52] U.S. Cl. .................. 210/167; 210/DIG. 8; 99/408

[51] Int. Cl.² ................ A47J 37/12; B01D 43/00

[58] Field of Search ............ 210/167, DIG. 8, 523, 210/525; 99/408

[56] References Cited

UNITED STATES PATENTS

| 801,204 | 10/1905 | Baum | 210/167 |
|---|---|---|---|
| 1,630,309 | 5/1927 | Pitman | 99/408 |
| 2,780,984 | 2/1957 | Kleeman | 99/408 |
| 3,188,942 | 6/1965 | Wandel | 210/167 |
| 3,334,749 | 8/1967 | Ladd | 210/167 |
| 3,446,138 | 5/1969 | Hasten et al. | 99/408 |
| 3,568,839 | 3/1971 | Dunlea | 210/526 |
| 3,641,923 | 2/1972 | Wilkenson | 99/408 |
| 3,733,202 | 5/1973 | Marmor | 99/408 |
| 3,831,767 | 8/1974 | Lefur et al. | 210/526 |
| 3,900,580 | 8/1975 | Boggs | 210/167 |

Primary Examiner—Thomas G. Wyse
Assistant Examiner—Ernest G. Therkorn
Attorney, Agent, or Firm—Rummler & Snow

[57] ABSTRACT

A deep fat fryer which maintains fat clean and extends fat life by automatically removing crumbs and food particles from the bottom of fat-containing vessels as said crumbs and food particles settle thereon during frying.

4 Claims, 5 Drawing Figures

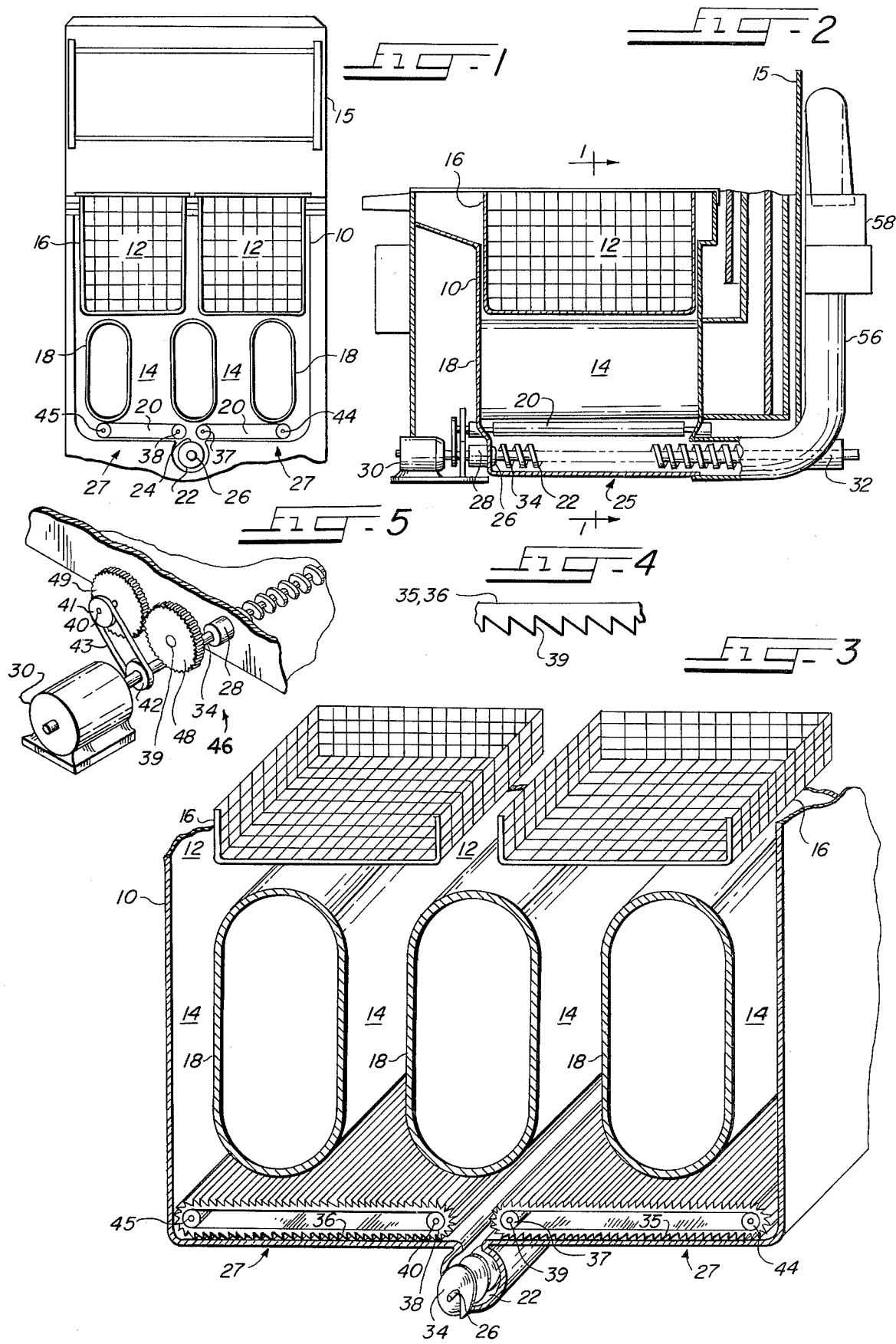

AUTO CRUMB REMOVER

BACKGROUND OF THE INVENTION

In cookers that roast edible nut meats and fry potato chips, the fall-off from the product, such as flour from the nuts, starch and particles from potato chips, contaminates the oil. Breaded foods or foods which are dredged in flour before frying give off large quantities of crumbs and food particles during frying. In the past, foreign materials have been removed from the cooking fat by periodically straining or filtering the fat as the contamination builds up. But now, because of the cost of straining or filtering the fat, this method of maintaining frying fat clean is economically unsound.

There is thus an established need for a deep fat fryer which provides for automatic removal of particles of crumbs and food as they settle out from the fat during frying.

SUMMARY OF THE INVENTION

The gist of this invention lies in a combination trough for collecting crumbs and food particles which are deposited on the bottom of fat-containing vessels of deep fat fryers during frying and a sweep which mounts above and in adjacent relation with the bottom of said vessels for pushing said crumbs and food paticles into said trough. A screw-type conveyor operationally mounts in the trough for transporting said crumbs and food particles and discharging the same into the inlet of the screw conveyor which pushes them through a conduit which is in fluid communication with the outlet from said screw conveyor to an outlet from said conduit which is above the level of the fat in the fat-containing vessel, and which discharges the crumb and food particles issuing therefrom into a receptacle. The friction due to the screw conveyor pressing the crumbs out of the conduit presses the excess fat from these particles.

DESCRIPTION OF THE DRAWINGS

FIG. 1 is a front elevation view of a cross-section along line 1—1 of FIG. 2;

FIG. 2 is a fragmentary side elevation of a cross-section along line 2—2 of FIG. 1;

FIG. 3 is a fragmentary perspective cross-section view of the fat-containing vessel along line 1—1 of FIG. 2;

FIG. 4 shows an enlarged cross-section of the sweep belt; and

FIG. 5 shows a fragmented perspective view of the drive train for the conveyor and the sweep belts.

DESCRIPTION OF THE PREFERRED EMBODIMENT

Referring to FIGS. 1 and 2, an open-top, fat-containing vessel 10 has an upper frying portion 12 and a lower heating portion 14. The upper portion of the vessel 10 contains hot liquid fat for cooking the food in wire baskets 16. The lower portion 14 thereof contains a plurality of heating tubes 18 through which hot combustion gases pass for heating the liquid fat that is carried by convection to the upper frying portion 12. Heating tubes 18 are open at both ends and extend through the fat-containing vessel 10 from front wall to back wall within the lower portion 14 spaced in side-by-side relation to each other and with respect to the side walls thereof by an amount to allow the free upward flow of the fat when heated and its return when cool under the force of gravity. Heating tubes 18 have their top surfaces located below the bottoms of the baskets 16 by a screen which prevents large pieces of food falling into the "cold zone". The bottom surfaces of tubes 18 are spaced above the bottom of the vessel 10 which, as shown in the drawings, is flat and horizontal and forms shallow cold zone 20 for trapping and holding crumbs and food particles which have settled out of the hot liquid fat during cooking. Opposite ends of each tube 18 bear a sealed relation with respect to each opening in the front wall and in the back wall of the vessel 10. Each tube 18 has a cross-section of substantially oblong shape which is generally symmetrical about both vertical and horizontal principal axes with the oblong axis lying in a vertical plane. A gas stack 15, which is in fluid communication with the opening of heating tubes 18 in the back wall of the heating portion 14 of the fat-containing vessel 10, extends upwardly adjacent to and outside of the back thereof.

Referring to FIG. 3, a trough 22, which is located in the bottom of the cold zone 20 of the lower heating portion 14 of the fat-containing vessel 10, has a closed end in the front wall of the vessel 10 and an open end at the back wall thereof. A slot-like opening 24 opens the trough 22 to the cold zone 20 from below. Opening 24 extends the length of the trough 22 from adjacent the inside surface of the front wall to adjacent the inside surface of the back wall and centrally locates between opposing right and left side walls of the fat-containing vessel 10, as shown in FIG. 1.

Referring to FIGS. 2 and 3, a conveyor means 25 comprises an auger screw shaft 26 centrally located within and extending along the length of trough 22. A front sealed bearing 28, which is mounted on the front wall of the vessel 10 on the outside surface thereof, rotationally supports shaft 26 at its forward end. An electric motor 30, which is electrically connected to a power source and has a suitable speed-reduction ratio, couples its output shaft to the forward end of the shaft 26 which extends outside the sealed bearing 28. An aft sealed bushing 32, which is mounted in the aft wall of vessel 10, rotationally supports the aft end of the shaft 26. An auger screw 34 is secured around the turning shaft 26. Conveyor 34 extends the length of the trough 22 from the front wall to the back wall of the fat-containing vessel 10, as shown in FIG. 2.

FIGS. 1 and 3 show a sweep means 27 comprising right hand and left hand chain drive pulleys 37 and 38, respectively, which are mounted above and adjacent to the right hand and left hand edges of opening 24. Pulleys 37 and 38 are each rotationally mounted in fore-and-aft sealed bearings 31 and 33 (not shown) which are mounted in the front and back walls, respectively, of the fat-container vessel 10. Right hand and left hand idler pulleys 44 and 45 are each rotationally mounted above the bottom of the fat-containing vessel 10 and adjacent to the inside of the right hand and left hand walls, respectively, thereof. Pulleys 44 and 45 are each rotationally mounted in fore-and-aft sealed bearings 47 and 49 (not shown), respectively. Bearings 47 and 49 are mounted in the front and back walls thereof.

Chains 35 and 36 each mount on drive and idler pulley sets 37 and 44 and 38 and 45, respectively. Buttressed crumb and food particle sweeping serrations 39, as shown in FIG. 4, mount on the outside surfaces of the belts 35 and 36 lying in a direction thereon which generally parallels the edges of opening 24 to the trough 22 in the bottom of vessel 10. Serrations 39 on the outside lower surface of belt 35 on the left side of the trough 22 have buttresses facing to the right and engage the top surface of the bottom of the fat-container 10 on the left side of trough 22. Serrations 39 on the lower outside surface of belt 36 on the right side of trough 22 have buttresses facing to the left and engage the top surface of the bottom on the right side of trough 22.

Drive train 46, as shown in FIG. 5, comprises first and second meshing spur gears 48 and 49, each of which mounts on the forward ends of and is concentric with the respective shafts 39 and 40 for drive pulleys 37 and 38. Shaft 39 ends at the forward face of first gear 48. Shaft 40 extends out from the forward face of second gear 49. A first sheave 41 operationally mounts on the extended end of shaft 40. A second sheave 42 operationally mounts on shaft 34 which is driven by motor 30. A belt 43 operationally engages both first and second sheaves 41 and 42, respectively, for driving said pulley shafts 39 and 40 through auger shaft 26 in conveyor 34.

A conduit 56, as shown in FIG. 2, has its inlet in fluid communication with the outlet of the trough 22 surrounding conveyor 34 and extends upward therefrom to a level above the level of the fat in the fat-containing vessel 10 from which its outlet discharges into a receptacle 58.

Although but one specific embodiment of this invention is herein shown and described, it will be understood that details of the construction shown may be altered or omitted without departing from the spirit of the invention as defined by the following claims.

I claim:

1. An apparatus for automatically removing crumbs and food particles from deep fat fryers comprising:
    a. a fat-containing vessel having fat-heating tubes extending therethrough over a flat, horizontal bottom and said tubes being located below at least one wire basket;
    b. a primary moving means mounting on said vessel having an input source of power and force and motion output;
    c. a trough in the bottom of said vessel having a slot-like opening thereto in fluid communication with the fat-containing vessel and an outlet therefrom in the wall of said vessel;
    d. a sweep means operationally-connected to the output of the primary moving means and mounted above and adjacent the bottom of said vessel for sweeping crumbs into said slot-like opening;
    e. a conveyor means operationally-connected to the output of the primary moving means and mounted in said trough for conveying material therethrough to the outlet therefrom;
    f. a conduit having its inlet in fluid communication with the outlet from the trough and its outlet outside of and at a level above the level of the fat in the fat-containing vessel; and
    g. a receptacle having its inlet in fluid communication with the outlet from the conduit.

2. An apparatus for removing crumbs and food particles deposited on the bottom of rectangular fat-containing vessels in deep fat fryers, as set forth in claim 1, wherein the sweep means comprises:
    a. a drive train having an input shaft mounted within said fat-containing vessel in parallel relation with opposing walls and operationally-mounted on and extending through one of the other walls thereof above and adjacent the bottom of the same and along the side of said slot-like opening, and operationally-connected to the output of the primary moving means;
    b. a drive pulley mounted on said input shaft within said vessel and extending between the other walls wherein the lower point of the outer circumference of said drive pulley extends adjacent the bottom of said fat-containing vessel along the side of and adjacent to the slot-like opening
    c. an idler shaft mounted within said fat-containing vessel and operationally-mounted on the other walls above and adjacent the bottom of the same spaced from and on the same side of said slot-like opening in parallel relation with said input shaft;
    d. an idler pulley mounted on said idler shaft within said vessel and extending between the other walls wherein the lower point of the outer circumference of said idler pulley extends adjacent the bottomm of said fat-containing vessel
    e. a continuous drive belt operationally engaging said drive pulley and said idler pulley and extending the length of the same; and
    f. a plurality of buttressed serrations mounted on the outside surface of said belt having a generally parallel relation with said slot-like opening and operationally-related with the bottom of said fat-containing vessel for pushing crumbs and food particles thereover in the direction of the slot-like opening.

3. An apparatus for removing crumbs and food particles deposited on the bottom of fat-containing vessels in deep fat fryers as set forth in claim 2 wherein the drive train comprises:
    a. a first sheave operationally-mounted on the output of said primary moving means;
    b. a second sheave operationally-mounted on the extension of said input shaft of said drive train in the plane of said first sheave;
    c. a power transmission belt operationally engaging said first and second sheaves;
    d. a first gear operationally-mounted on the extension of said input shaft of said drive train outside said fat-containing vessel on one side of said slot-like opening in said bottom of said vessel; and
    e. a second gear operationally-mounted on the extension of the other input shaft on said other side of said slot-like opening in the bottom thereof enmeshing with said first gear.

4. An apparatus for removing crumbs and food particles deposited on the bottom of fat-containing vessels in deep fat fryers as set forth in claim 1 wherein the conveyor means comprises:
    a. a conveyor drive shaft operationally connected to the output shaft of the prime mover; and
    b. an auger screw operationally mounted on said conveyor drive shaft.

* * * * *